United States Patent [19]

Billig

[11] Patent Number: 5,135,184

[45] Date of Patent: Aug. 4, 1992

[54] PROPELLANT UTILIZATION SYSTEM

[75] Inventor: Frederick S. Billig, Rockville, Md.

[73] Assignee: The Johns Hopkins University, Baltimore, Md.

[21] Appl. No.: 570,760

[22] Filed: Aug. 22, 1990

[51] Int. Cl.⁵ .................... B64D 31/02; B64D 27/24
[52] U.S. Cl. .................... 244/53 R; 244/62; 244/73 R; 244/117 A
[58] Field of Search ............. 244/53 R, 59, 62, 73 R, 244/74, 95, 117 A, 207

[56] References Cited

U.S. PATENT DOCUMENTS

| | | | |
|---|---|---|---|
| 3,229,459 | 1/1966 | Cervenka | 60/244 |
| 3,690,102 | 9/1972 | Du Pont | 60/270.1 |
| 4,778,130 | 10/1988 | Kim | 244/53 R |
| 4,807,831 | 2/1989 | Brewer et al. | 244/117 A |
| 4,986,495 | 1/1991 | Stromath et al. | 244/117 A |

FOREIGN PATENT DOCUMENTS 2197836  6/1988  United Kingdom ............ 244/62

*Primary Examiner*—Joseph F. Peters, Jr.
*Assistant Examiner*—Anne E. Bidwell
*Attorney, Agent, or Firm*—Robert E. Archibald; Mary Louise Beall

[57] ABSTRACT

The invention is a propellant utilization system for flight vehicles operating in both the subsonic and supersonic speed ranges. In particular, the invention uses steam and water produced in the system to replace hydrogen as a coolant and for power generation. It also provides for the utilization or oxygen obtained from air captured by the air inlet instead of oxygen stored in the vehicle.

14 Claims, 2 Drawing Sheets

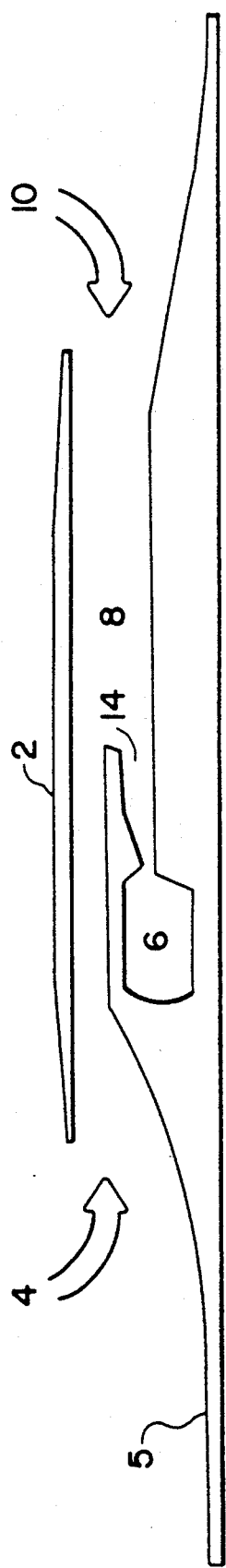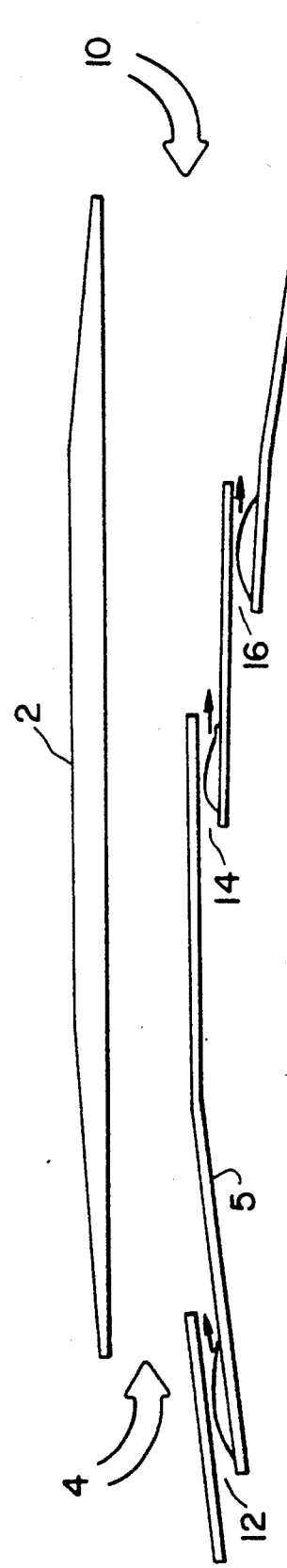

PROPELLANT UTILIZATION SYSTEM

STATEMENT OF GOVERNMENTAL INTEREST

The Government has rights in this invention pursuant to Contract No. N00039-89-C-5301 (formerly N00024-85-C-5301) awarded by the Department of the Navy.

BACKGROUND OF THE INVENTION

The invention is a propellant utilization system for an integrated rocket-ramjet powered flight vehicle for subsonic and supersonic operation. In particular, the system of the invention uses phase changes and energy partitioning to obtain optimal propulsive efficiency and to provide thermal protection to the flight vehicle.

U.S. Pat. No. 3,807,170, describes a fuel injection subsystem for a missile whose fixed geometry engine is capable of both subsonic and supersonic operation. Both solid and liquid fuels are used. The fuel is ducted to various points in the engine to provide propulsion for the missile, to pressurize the liquid fuel tanks, to function as a pilot light, to throttle hot gases, to redirect hot gasses from the solid fuel and to be used as a regenerative coolant.

U.S. Pat. No. 3,229,459 discloses a hybrid power plant operating as a jet at low altitudes and as a rocket at high altitudes. Liquid air and SF-1 fuel are used as fuels. In the rocket mode, the jet afterburner becomes on chamber and the SF-1 fuel is oxidized by the liquid air.

U.S. Pat. No. 3,812,672 describes a hybrid power plant in which the ramjet combustor serves as the afterburner for the turbofan. Hydrogen peroxide and JP fuel are combined as propellant.

U.S. Pat. No. 3,395,539 discloses a combined turbojet, ramjet engine in which liquid and/or gaseous oxygen is used a fuel and as a coolant.

U.S. Pat. No. 3,690,102 discloses a system to condense incoming air to the liquid or partly liquid state for use in a supersonic ram jet.

OBJECTS OF THE INVENTION

It is a object of the present invention to simultaneously obtain optimal propulsive efficiency and provide thermal protection to the flight vehicle.

It is another object of the present invention to increase the safety of the flight vehicle by using steam and/or water as a coolant rather than hydrogen, wherever possible.

Another object of the invention is to provide a steam propulsion system to insert the flight vehicle into orbit, to meet the vehicle's power requirements while in orbit and to deorbit the vehicle.

It is another object of the invention to provide stream propulsion for a powered landing.

Still another object of the invention is to tailor the use of propellant(s) to obtain the maximum velocity and/or range with the least amount of propellant.

It is another object of the invention to utilize the cooling capacity of cryogenic propellant(s) stored in the flight vehicle before the propellant is injected into the engine for combustion.

Another object of the invention is to provide a propulsion system which meets the weight and propellant requirements while providing adequate space within the flight vehicle for the tankage, airframe, crew and their life support systems as well a payload.

SUMMARY OF THE INVENTION

The invention is a propellant utilization system for flight vehicles operating in both the subsonic an supersonic speed ranges. In particular, the invention uses steam and water produced in the system to replace hydrogen for power generation and as a coolant, respectively. It also provides for the utilization of oxygen obtained from air captured by the air inlet instead of oxygen stored in the vehicle.

The basic concept involves storing propellants or monopropellant in their optimal energy/phase states, passing the propellants through appropriate turboexpanders, compressors, pumps, catalytic beds, reactors, heat exchangers, separators and condensers to obtain the desired composition, phase and energy state prior to injection into a combined rocket-ramjet/scramjet (ramscramjet) propulsion system. The propellants are partitioned to provide coolant flows for forced convection, transpiration and/or film cooling systems, as the motive fluid for an ejector, as the fuel to react with air ingested in the engine, as a turbulence enhancer or inhibitor, as a reaction suppressor and as a boundary layer energizer.

BRIEF DESCRIPTION OF THE DRAWINGS

FIG. 1 is a representation of a flight vehicle.

FIG. 2 is a representation of a flight vehicle showing the location of various injectors.

Figure 3:
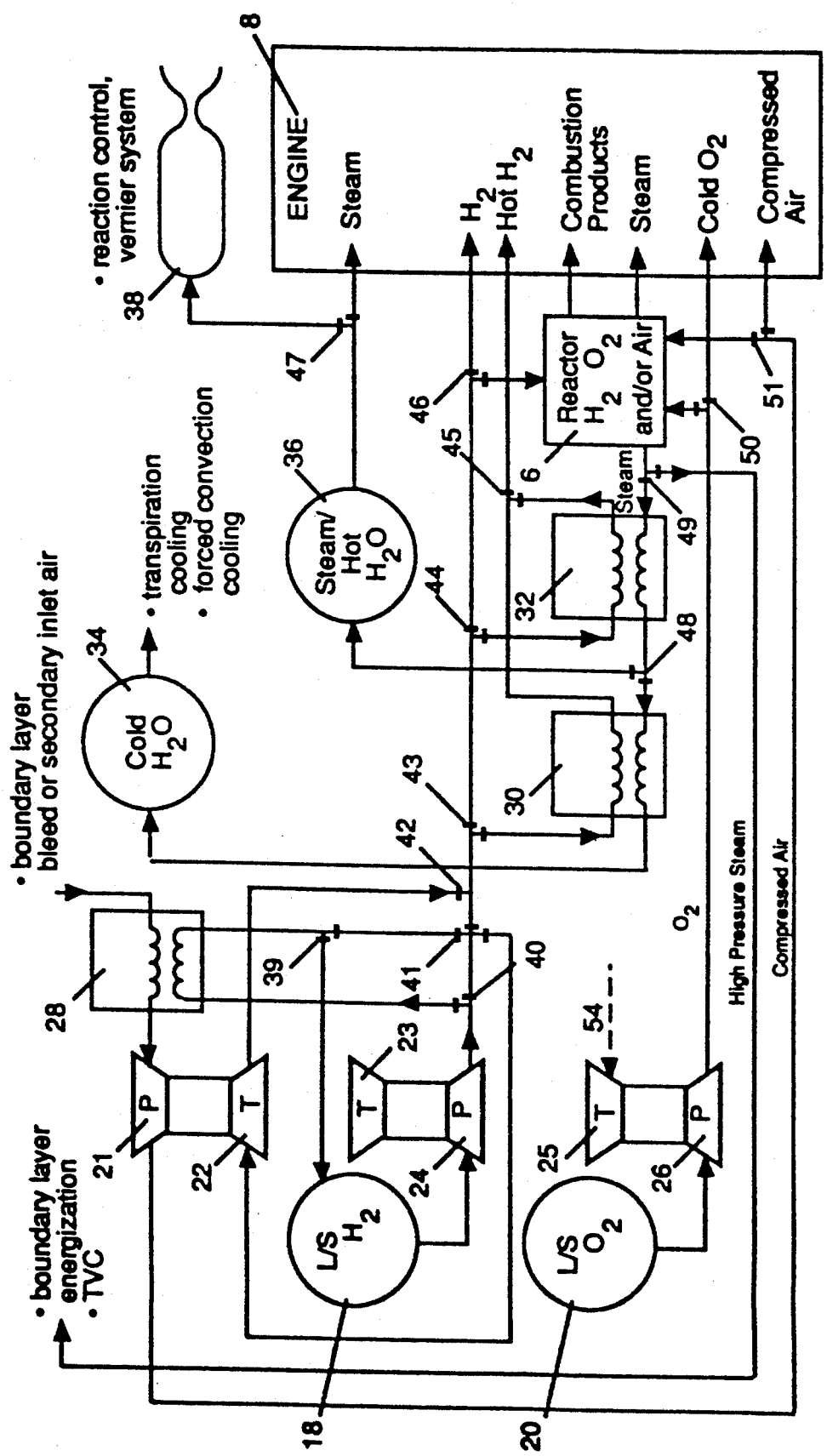
FIG. 3 is a diagram of the basic propellant utilization system of the present invention.

The most simple system stores two-phase (liquid/solid) hydrogen and two-phase (liquid/solid) oxygen near or at their respective triple points, the temperature where all three phases (solid, liquid and gas) can coexist. At this temperature, both hydrogen and oxygen can gain or loose some heat with no change in temperature, no significant change in volume and no excessive pressure increase. The triple point for hydrogen is approximately 25° R and for oxygen is approximately 98° R.

The hydrogen should be stored in the para energy state. At room temperature, an equilibrium mixture of gaseous hydrogen contains about 75% ortho state hydrogen and 25% para state hydrogen. This is called "normal" hydrogen. The two states are characterized by the direction of the spin of the protons in the hydrogen molecule: in ortho, the spins are in the same direction and in para, the spins are in opposite directions. An equilibrium mixture of liquid hydrogen at its boiling point (36.5° R) is comprised of about 99.8% para state. The heat to convert from one state to another is strongly temperature dependent.

Before injection into the rocket engine for combustion, hydrogen and oxygen must be pressurized and can be heated. This presents the possibility of utilizing the cooling capacity of these propellants, especially the hydrogen, before they are combusted in the propulsion system. The cooling capacity on board the flight vehicle is derived from changes in phase, such as solid to liquid, from changes in energy state, such as from para to ortho and from the sensible heat or enthalpy of the propellant. The cooling capacity is used to cool parts of the flight vehicle which are subject to heating, such as the leading edges, the engine or combustor walls and nozzle by transpiration cooling and film cooling. The leading edges include expansion and base surfaces such as wings, tails, rudders, elevons and canards, for example. Since it is easier to compress the propellants when they are cold, the cooling capacity is also used to enhance the efficiency of the compression step of the modified Brayton thermodynamic cycle, the operating principle of the engine.

Although the cryogenic propellant is stored in the liquid/solid phase, it is more efficient to pump or compress the propellant in the liquid phase. Liquid propellant, heated through use as a coolant, can be recirculated to the storage tank to be recooled by melting some of the solid. This utilizes the heat of fusion to maintain the propellant at the same temperature.

Other important features of the invention will be described referring to FIG. 1, a generic representation of a flight vehicle.

In the vehicle, 2 designates the cowl, 4 generally indicates the inlet, 6 designates the reactor, 8 designates the engine or combustor and 10 generally indicates the nozzle. Air inlet, 4, is defined by surface 5 of the flight vehicle and cowl 2. Hydrogen and oxygen react in reactor 6 to produce steam (water), some of which may be injected into the engine through injector 14. Hydrogen propellant is also injected into the engine through injector 14. The basic propulsive reactions occur in engine 8 and nozzle 10 and the effluent is exhausted through nozzle 10.

The ability to recirculate and recool is especially important for hydrogen since it is a well known coolant used in flight vehicles. Hydrogen is used to cool steam produced in reactor 6, the leading edges of the flight vehicle, air captured in inlet 4 and for transpiration and film cooling of reactor 6, engine 8 and nozzle 10.

A major feature of this invention is its ability to utilize air captured by inlet 4 as a propellant source. Since it is more efficient to pump air in the liquid state, the captured air can be liquified. This is accomplished by using the cooling capacity of hydrogen. However, one pound of hydrogen will only condense or liquefy about five pounds of air. Thus, the ability to recirculate hydrogen and recool it without changing the temperature in the storage tank is very useful since the recooled hydrogen can be used again as needed, especially to cool and compress more air. The ability to use oxygen in the captured air as a propellant or oxidizer reduces the total amount of oxidizer required to be stored on board the flight vehicle and results in a savings of space and weight.

Hydrogen is also conserved by using water instead of hydrogen as a coolant. Although hydrogen can be a better coolant than water, water is easier to pump and deliver because it is more dense. Water is much safer to use than hydrogen in that hydrogen may burn in undesired locations or detonate. For example, a hydrogen leak is much more dangerous than a water leak. Water is also an effective transpiration coolant in the engine whereas hydrogen coolant can burn and defeat the purpose of transpiration cooling. If the coolant is to be dumped after use, it is safer to dump water than hydrogen and far less propulsive energy is expended.

At lower speeds in the range of approximately Mach 0–6, air captured in inlet 4 can provide some cooling to the flight vehicle but part of it also is liquefied as discussed above and may be used as propellant/oxidizer in engine 8. Because this propellant/oxidizer is obtained and compressed during flight, the amount of liquid/solid oxygen required to be carried on board may be reduced resulting in a savings of space and weight. The ability to make propellant/oxidizer from captured air is a back-up system for the liquid/solid oxygen supply carried on board.

The thus produced liquid air is also pumped to reactor 6 to react with hydrogen to produce steam. After being condensed to water by heat exchange with hydrogen, the water is stored and is available for use during flight. Cold water replaces hydrogen as a coolant for transpiration cooling of the engine and for forced convection cooling of the flight vehicle. Hot water is also stored. The hydrogen heated by heat exchange with the steam is injected into engine 8 to be oxidized for propulsion. Generally, water is not made from air at speeds above Mach 6 because air at these higher speeds is very hot and the heat extraction from the air requires too much of the cooling capacity to be efficient. If water is needed above Mach 6, it can be made using the liquid/solid oxygen supply on board.

Part of the steam produced in reactor 6 is diverted and injected into inlet 4 through injector/ejector 12 shown in FIG. 2. This energizes the boundary layer air on surface 5 of inlet 4, for example. As discussed above, steam or hot water may be ejected into the engine through injector/ejector 14 for transpiration cooling of the walls of engine 8, for example. In an actual flight vehicle, a plurality of injector/ejector 12 and 14 are provided. Steam is also available to provide a source of on board power called the reaction control vernier system. As steam ejectors, this system provides propulsion for orbit insertion, orbital demands and deorbiting. Steam also provides the capability for powered landing of the flight vehicle. Power to direct the flight vehicle during flight is obtained through the use of a thrust vector control system (TVC) also powered by steam produced in reactor 6 and provided to injector 16. Although only one nozzle injector 16 is shown in FIG. 2, each flight vehicle is provided with a plurality. Injecting steam from the appropriate nozzle injector(s) 16 provides a means to control the direction of the vehicle.

DESCRIPTION OF THE PREFERRED EMBODIMENT

This embodiment will be described referring to FIG. 3 which represents a propellant utilization system within a flight vehicle. Liquid/Solid (L/S) hydrogen propellant is stored in tank 18 and L/S oxygen propellant in tank 20.

As shown in FIG. 3, the system of the invention requires the use of a plurality of valves able to direct the fluid propellants to various locations in the flight vehicle. Valve 42 is a one-way valve; valves 39, 40, 43, 44, 45, 46, 47, 48, 49, 50 and 51 are two-way valves and valve 41 is a three-way valve. These valves may be individually operated to meet the propellant supply requirements of the system. The valve regulator system is operated through means known in the art.

In the description of the preferred embodiment, the term "pump" relates to a liquid being compressed and/or pumped and the term "compress" relates to a vapor being compressed and/or pumped.

Liquid hydrogen from tank 18 is pumped into engine 8 by pump 24 through valves 40, 41, 43, 44, 45 and 46. Liquid oxygen from tank 20 is pumped into engine 8 by pump 26 through valve 50. In engine 8, the hydrogen is oxidized by oxygen to produce the main propulsive force for the flight vehicle.

Liquid hydrogen from tank 18 also is pumped to reactor 6 through valve 46. Liquid oxygen from tank 20 is pumped to reactor through valve 50. As will be described more fully below, liquid oxygen may also be obtained from air captured by inlet 4 of FIGS. 1 and 2. In reactor 6, the hydrogen and oxygen react to form steam. High pressure steam from reactor 6 is provided through valve 49 for boundary layer energization of the inlet air as well as to power the thrust vector control injector nozzles 16 of FIGS. 1 and 2, when required. Steam also is conducted to heat exchangers 30 and 32. In another embodiment boundary layer energization and TVC may be operated by steam obtained from tank 36.

Hydrogen also is pumped by pump 24 through valves 40, 41 and 43 to heat exchanger 30 and through valves 40, 41, 43 and 44 to heat exchanger 32. The cooling capacity of the hydrogen is used to condense the steam to water. Low pressure steam/hot water flows from heat exchanger 32 through valve 48 to steam/hot water storage tank 36 where it is available to power the reaction control vernier system 38 for the vehicle. This system comprises a plurality of steam ejectors (not shown) which are individually operated to provide power for orbit insertion, orbital demands or deorbiting, as the case may be. Steam ejected through valve 47 to engine 8 can be used to provide power for landing the flight vehicle. Cold water flows from heat exchanger 30 to cold water storage tank 34 where is available for transpiration cooling of the engine and forced convection cooling throughout the flight vehicle. In particular, this cold water cools the leading edges (not shown) of the vehicle.

The hydrogen heated by heat exchange in exchangers 30 and 32 is directed through valve 45 and supplied as propellant in engine 8.

Hydrogen also is used to cool the boundary layer bleed air captured in inlet 4 of FIGS. 1 and 2 as well as any secondary inlet air captured. Hydrogen is pumped by pump 24 through valve 40 and into heat exchanger 28. Captured air provided to heat exchanger 28 is cooled by the hydrogen and, consequently, heats the hydrogen. The thus heated hydrogen flows through valve 41 either to be combusted in the engine 8, to be returned to the liquid/solid storage tank for cooling by melting the solid hydrogen and reused as coolant or to drive turboexpander 22.

Air cooled in heat exchanger 28 is compressed in pump 21 and supplied through valve 51 to either reactor 6 or engine 8. In reactor 6 oxygen in the compressed air replaces or supplements oxygen from tank 20 in the reaction with hydrogen to generate steam, as discussed above. In engine 8, oxygen in the liquid air is available to replace or supplement liquid oxygen from tank 20, as required.

Generally speaking, steam is generated using captured compressed air at speeds below about Mach 6. At about Mach 6 and above, the temperature of the captured air is too high to be cooled efficiently by the liquid hydrogen from tank 18. If additional water is required above Mach 6, the required oxygen is obtained from tank 20.

Three pumps 21, 24 and 26 are drivingly connected to three turboexpanders 22, 23 and 25 respectively. According to the invention, any source of hot vapor obtained within the flight vehicle may be used to drive any turboexpanders and any turboexpanders may drive any one or more pumps. An example is shown in FIG. 3 wherein hydrogen heated in heat exchanger 28 is expanded in turboexpander 22 to drive pump 21. Other sources of hot vapor are steam from the reactor and hot hydrogen from heat exchangers 30 and 32. In this preferred embodiment, hot vapor, from any on board source is indicated by the dotted line arrow 54 and drives turboexpander 25 which in turn drives pump 26 to generate electricity and hydraulic power for use within the vehicle.

Thus, the propellant utilization system of the invention first of all provides a method to optimize the use of hydrogen within the flight vehicle. Mainly hydrogen is used for its chemical energy in the propulsion system of the flight vehicle. However, before it is combusted in engine 8, the cooling capacity of part of the liquid/solid hydrogen is used to cool steam from reactor 6 in heat exchangers 30 and 32, to cool boundary layer bleed air in heat exchanger 28 and to recool hydrogen from the heat exchangers and from the forced connection cooling systems. The hydrogen is also available for cooling the leading edges, for transpiration cooling of the engine and other cooling needs within the flight vehicle.

Secondly, according to the invention hydrogen reacts with oxygen in reactor 6 to produce steam which energizes the boundary layer air and powers the TVC. Low pressure steam powers the reaction control vernier system and provides a power system for landing. Steam, when cooled to water through heat exchange with liquid hydrogen can replace hydrogen as a coolant either by design or as a backup system.

Thirdly, the invention includes means to use air captured in the inlet to make steam (water) and to oxidize hydrogen in the engine as propellant, either by design or as a backup system.

According to variations of the invention hot hydrogen produced through heat exchange with steam in heat exchangers 30 and 32 is ejected over the outside surface of the flight vehicle to reduce atmospheric drag on the vehicle. Steam and/or water also may be used for this external drag reduction. Hot hydrogen is also injected into the nozzle as a momentum contributor for the engine exhaust thrust.

The invention described is not intended to be limited to the embodiments disclosed but includes modifications made within the true spirit and scope of the invention.

I claim:

1. A propellant utilization system for a flight vehicle comprising:
   providing a supply of oxygen on board the flight vehicle;
   providing a separate supply of hydrogen on board the flight vehicle;
   providing an engine comprising a combustor and a nozzle;
   providing a reactor;
   combusting part of the hydrogen with part of the oxygen in the engine to produce energy to propel the flight vehicle; and
   combusting another part of the hydrogen with another part of the oxygen in the reactor to produce steam;
   wherein the thus produced steam is used as a propellant in the operation of the flight vehicle; and
   wherein the steam is condensed and the thus produced water is used as a coolant in the operation of the flight vehicle.

2. A system according to claim 1, wherein the hydrogen and the oxygen each are provided in a two-phase liquid/solid state and further wherein the hydrogen is provided in the para energy state.

3. A system according to claim 2, wherein the hydrogen is circulated as a coolant for at least one of:
   condensing steam produced in the reactor;
   cooling of leading edges of the flight vehicle;
   forced convection cooling of the system;
   transpiration cooling of the reactor and nozzle; and
   film cooling of the reactor and nozzle.

4. A system according to claim 3, wherein coolant water produced by condensing the steam is sued as coolant for at last one of:
   a forced convention cooling circuit for the flight vehicle;
   leading edge cooling;
   external drag reduction;
   transpiration cooling of the reactor and nozzle; and
   film cooling of the reactor and nozzle.

5. A system according to claim 3, wherein hot gaseous hydrogen is produced by heat exchange with steam produced in the reactor, said hot hydrogen being used for at least one of:
   injection to reduce atmospheric drag on the outside surface of the flight vehicle;
   injection as a momentum contributor for the vehicle; and
   circulation to the engine for combustion with oxygen.

6. A system according to claim 3 wherein hot gaseous hydrogen is produced by heat exchange with steam in the reactor, said hydrogen being circulated to the separate supply of two-phase liquid/solid state and para energy state hydrogen for recooling the thus heated hydrogen and for reuse of the thus cooled hydrogen as a coolant.

7. A system according to claim 1, wherein the supply of oxygen is one of an oxygen supply carried within the flight vehicle and air captured by an air inlet of the flight vehicle.

8. A system according to claim 7, wherein air captured by the air inlet is cooled through heat exchange with cold hydrogen and then compressed to liquid air which is used to provide oxygen to at least one of the reactor and the engine.

9. A system according to claim 8, wherein hydrogen heated by heat exchange with the captured air is circulated to the separate supply of hydrogen for recooling and for reuse of the thus cooled hydrogen as a coolant, said source of hydrogen being provided in a two-phase liquid/solid state and in the para energy state.

10. A system according to claim 1, wherein steam produced in the reactor is used for at least one of:
    boundary layer energizing;
    generating power on board the flight vehicle;
    propulsion for powered landing of the flight vehicle;
    propulsion for orbit insertion, orbital demands and deorbiting; and
    injection to reduce atmospheric drag on the outside surface of the flight vehicle.

11. A system according to claim 1, wherein:
    high pressure steam is produced in the reactor;
    a third part of the hydrogen is used to condense at least a part of the high pressure steam to low pressure steam and hot water; and
    a fourth part of the hydrogen is used to condense at least part of the low pressure steam and hot water to cold water.

12. A propellant utilization system for a flight vehicle comprising:
    providing a supply of liquid/solid oxygen on board the flight vehicle;
    providing a separate supply of liquid/solid hydrogen in the para energy state on board the flight vehicle;
    providing an engine comprising a combustor and a nozzle;
    providing a reactor;
    combusting part of the hydrogen with part of the oxygen in the engine to produce energy to propel the flight vehicle;
    combusting a second part of the hydrogen with a second part of the oxygen in the reactor to produce steam;
    cooling and condensing the steam through heat exchange with a third part of the hydrogen resulting in heating the third part of the hydrogen; and
    circulating the thus heated hydrogen to the source of hydrogen for recooling and reuse as a coolant.

13. A system according to claim 12, wherein the liquid/solid hydrogen supply is maintained at its triple point temperature and the circulated hydrogen is recooled to the triple point temperature utilizing the cooling capacity derived by melting the solid hydrogen.

14. A system according to claim 13, wherein the supply of oxygen is one of an oxygen supply carried within the flight vehicle and air captured by an air inlet of the flight vehicle;
    wherein air captured in the inlet is cooled and condensed by heat exchange with a fourth part of the liquid/solid hydrogen resulting in heating the fourth part of the hydrogen; and
    wherein the thus heated fourth part of the hydrogen is circulated to the separate supply of hydrogen for recooling and reuse as a coolant.

* * * * *